(12) United States Patent
Ushijima-Mwesigwa et al.

(10) Patent No.: US 12,174,025 B2
(45) Date of Patent: Dec. 24, 2024

(54) ROUTE GENERATION FOR VEHICLE ROUTING PROBLEM AND VARIANTS THEREOF

(71) Applicant: Fujitsu Limited, Kawasaki (JP)

(72) Inventors: Hayato Ushijima-Mwesigwa, Dublin, CA (US); Hanjing Xu, Lafayette, IN (US); Indradeep Ghosh, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 228 days.

(21) Appl. No.: 18/061,280

(22) Filed: Dec. 2, 2022

(65) Prior Publication Data
US 2024/0183670 A1 Jun. 6, 2024

(51) Int. Cl.
*G01C 21/34* (2006.01)
(52) U.S. Cl.
CPC .................. *G01C 21/3446* (2013.01)
(58) Field of Classification Search
CPC .................................................. G01C 21/3446
USPC ........................................................ 701/422
See application file for complete search history.

(56) References Cited

U.S. PATENT DOCUMENTS

| | | | | |
|---|---|---|---|---|
| 8,856,075 B2* | 10/2014 | Rathod | .................. | H04L 51/52 |
| | | | | 707/769 |
| 11,132,422 B2* | 9/2021 | Chen | .................. | G06F 17/16 |
| 2017/0063909 A1* | 3/2017 | Muddu | .................. | H04L 63/20 |
| 2019/0164418 A1* | 5/2019 | Neukart | .................. | G08G 1/0129 |

FOREIGN PATENT DOCUMENTS

| | | | | |
|---|---|---|---|---|
| CN | 113544711 | * | 10/2021 | |
| EP | 4099239 A1 | * | 12/2022 | .......... G06Q 10/047 |

OTHER PUBLICATIONS

Borowski et al., "New Hybrid Quantum Annealing Algorithms for Solving Vehicle Routing Problem", Springer Nature, Computational Science—ICCS 2020, May 25, 2020, 12142, pp. 546-561.*

(Continued)

*Primary Examiner* — Muhammad Shafi
(74) *Attorney, Agent, or Firm* — Fujitsu Intellectual Property Center; Tiep H. Nguyen

(57) ABSTRACT

According to an aspect of an embodiment, operations include receiving data associated with a vehicle routing problem, the data comprising first information about a plurality of vehicles in a geographical region and second information about a set of locations that the plurality of vehicles is required to serve. The operations further include determining a formulation of a multi-objective clustering problem based on the data and converting the formulation into a QUBO formulation. The operations further include generating a binary solution by solving the QUBO formulation on an optimization solver machine. The operations further include partitioning the set of locations into location clusters based on the binary solution and generating a set of candidate routes for the plurality of vehicles based on the location clusters. The operations further include controlling a device to render at least one route recommendation for the plurality of vehicles based on the set of candidate routes.

20 Claims, 5 Drawing Sheets

(56) References Cited

OTHER PUBLICATIONS

Borowski, Michal et al., "New Hybrid Quantum Annealing Algorithms for Solving Vehicle Routing Problem", Springer Nature Switzerland AG 2020, LNCS 12142, pp. 546-561.
Fisher, Marshall L. et al., "A Generalized Assignment Heuristic for Vehicle Routing", Decision Sciences, pp. 1-26.
Ryan, David M. et al., "Extensions of the Petal Method for Vehicle Routeing", J. Opl Res. Soc., vol. 44, No. 3, pp. 289-296, 1993.
Taillard, E., "Parallel Iterative Search Methods for Vehicle Routing Problems", Networks, vol. 23, 1993, pp. 661-673.

\* cited by examiner

ROUTE GENERATION FOR VEHICLE ROUTING PROBLEM AND VARIANTS THEREOF

FIELD

The embodiments discussed in the present disclosure are related to route generation for a vehicle routing problem and variants thereof.

BACKGROUND

Advancements in the field of logistics planning and transportation have led to development of solutions of combinatorial optimization problems such as a Vehicle Routing Problem (VRP). VRP is a Non-deterministic Polynomial-time (NP)-hard optimization problem whose solution may involve determination of optimal or efficient routes, that may be used by vehicles to provide services such as transportation of raw materials, product distribution, supply-chain related processes, delivery of goods at customer locations, and so on. VRP may have variants due to application-specific constraints such as vehicle capacities, delivery time windows, split deliveries, and so on. Examples of VRP variants may include capacitated VRP (CVRP), CVRP with time-widows (CVRPTW), Inventory Routing Problem (IRP), Open VRP (OVRP), and so on. A solution of a particular VRP variant may not be applicable to other VRP variants. This may be because conventional optimization solvers are designed to solve a specific VRP variant due to constraints that may be applicable to the specific VRP variant and complexity of the specific VRP variant. Further, specialized hardware or software optimization solvers that may be designed to solve a combinatorial optimization problem may be constrained by physical hardware or based on a number of variables that may be included in the combinatorial optimization problem. The hardware or software optimization solvers may not be scalable to larger problem instances.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations. The set of operations include receiving data associated with a vehicle routing problem. The received data may include first information about a plurality of vehicles in a geographical region and second information about a set of locations that the plurality of transport vehicles may be required to serve. The set of operations may further include determining a formulation of a multi-objective clustering problem based on the received data and converting the formulation of the multi-objective clustering problem into a Quadratic Unconstrained Binary Optimization (QUBO) formulation. The set of operations may further include generating a binary solution by solving the QUBO formulation on an optimization solver machine. The set of operations may further include partitioning the set of locations into a set of location clusters based on the binary solution and generating a set of candidate routes for a fleet or plurality of transport vehicles based on the set of location clusters. The set of operations may further include controlling a user device to render at least one route recommendation for the plurality of vehicles based on the set of candidate routes.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

Figure 1:
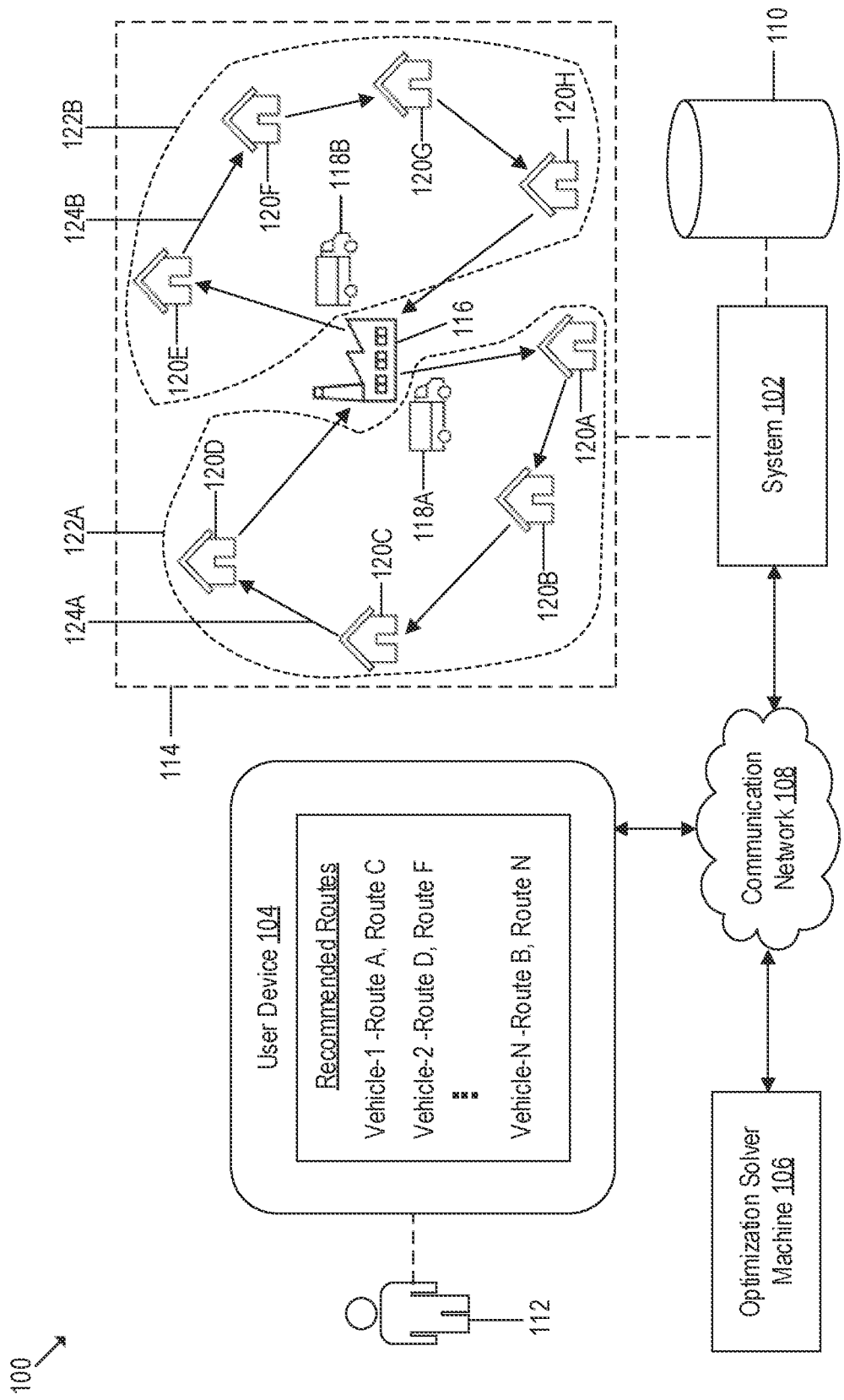
FIG. 1 is a diagram representing an example environment related to route generation for a Vehicle Routing Problem (VRP) and variants thereof.

all according to at least one embodiment described in the present disclosure.

DESCRIPTION OF EMBODIMENTS

Some embodiments described in the present disclosure relate to methods and systems for generation of routes for a Vehicle Routing Problem (VRP) and variants thereof. Herein, the vehicle routing problem may be a combinatorial optimization problem whose goal may be to determine a set of optimal routes between a central depot and a set of locations. The set of optimal routes may be used by a plurality of vehicles to transport items to the set of locations. The usage of the optimal routes by the vehicles may allow minimization of cost involved in the transportation of items using the plurality of vehicles. For example, a cost may be defined based on a distance that may be covered by the plurality of vehicles to deliver items to the set of locations, or a time spent in delivering the items to the set of locations.

VRP may have variants such as a Traveling Salesman Problem (TSP), a Capacitated Vehicle Routing Problem (CVRP), a Vehicle Routing Problem with Time-Windows (VRPTW), or a Pickup and Delivery Problem with Time-Windows (PDPTW). Each VRP variant may be bounded by a set of constraints. The set of constraints may vary amongst VRP variants based on application specific requirements associated with each VRP variant. The constraints may include, for example, a vehicle's capacity, a customer demand, a time window within which the delivery needs to be completed, and so on. Based on the constraints defining a VRP, hardware and/or software-based optimization solvers (for example, heuristics, meta-heuristics, exact algorithms, approximate algorithms, and so on) may be used for determination of a set of optimal routes as a solution of VRP.

Conventional hardware or software-based optimization solvers are designed to solve a certain variant of VRP based on constraints that define the variant of the VRP. The solutions may include creating location clusters and generating routes that include locations assigned to the location clusters. A solution generated by an optimization solver for a particular VRP variant, may not be effective for other variants of VRP. For example, a set of routes generated as an optimal solution of CVRP (defined by constrains such as vehicle capacity and customer demand) may not be an optimal solution for VRPTW (which may be defined by constrains such as vehicle capacity, customer demand, and time window for delivery of customer demand). This may be due to Non-deterministic Polynomial-time (NP)-hard nature of each variant of VRP. Further, a conventional optimization solver for generating optimal routes for a VRP variant (based on a set of constraints defining the VRP variant) may be efficient only if the number of variables associated with the VRP variant is constant. For example, the variables may include number of vehicles involved in a transport of goods, a scheduling period of the vehicles, and a number of locations required to be visited by the vehicles. The efficiency of the conventional optimization solver may be affected if the VRP is scaled to a larger problem instant (due to an increase in number of vehicles and number of locations) or an increase in number of variables associated with the VRP variant. For a hardware based conventional optimization solver, the number of variables that can be handled for determination of optimal routes may be limited due to constraints of a physical hardware. Some conventional optimization solvers may generate same or similar solutions (i.e., routes) if a VRP is solved multiple times.

According to one or more embodiments of the present disclosure, the technological field of discrete optimization may be improved by configuring a system for creating high-quality VRP routes. The disclosure presents an improved route generation method for generating a large set of candidate routes that may be generalized (as optimal) for all variants of VRP. During operation, the system may receive data associated with the VRP or its variants. The data may include information about a plurality of vehicles in a geographical region and information about a set of locations that the plurality of vehicles may be required to serve. Based on the data, the system may determine a formulation of a multi-objective clustering problem (which is an optimization problem), and may convert the formulation into a Quadratic Unconstrained Binary Optimization (QUBO) formulation. Further, the system may generate a binary solution by solving the QUBO formulation on an optimization solver machine. The computing system may partition the set of locations into a set of location clusters based on the binary solution and may generate a set of candidate routes for the plurality of vehicles based on the set of location clusters. Finally, the computing system may control a user device (e.g., a workstation that includes a display device) to render at least one route recommendation for the plurality of vehicles based on the set of candidate routes.

The disclosed method and system may formulate the VRP or its variants into a multi-objective optimization problem (i.e., a clustering problem) that includes multiple objective functions. The multi-objective optimization problem may be converted into a single objective optimization problem to enable formulating or modelling the clustering problem as a QUBO using heuristics. The conversion may be based on a generation of a weighted summation of individual objective functions (used in formulation of the multi-objective optimization problem) and associating the individual objective functions with weight coefficients. The weight coefficients may be used to adjust contributions of the individual objective functions in the weighted summation. The optimization solver machine (for example, a quantum inspired hardware) may be used for minimization of the weighted summation based on a set of predefined constraints. The minimization may lead to the generation of a binary solution that may be used for the partitioning of the set of locations into the set of location clusters. The binary solutions may be generalized for all variants of VRP.

The weights assigned to the individual objective functions may be adjusted for generation of a plurality of binary solutions. The adjustment of the weights may be such that each binary solution (i.e., generated based on a combination of weights (that may be assigned to the individual objective functions)) is a Pareto-optimal solution. This may allow generation of high-quality (optimal) candidate routes (by solving a route generation problem) based on each of the binary solutions. For a binary solution that corresponds to a set of location clusters, a candidate route may be generated for each location cluster of the set of location clusters. The candidate route may be generated as a solution of a sub-problem of a VRP. The partitioning of the set of locations into the set of location clusters may enable splitting of the VRP into a set of sub-problems that may lead to reduction in time and computational complexities of the VRP. Each sub-problem may require generation of a candidate route and the solution of the VRP may require generation of a set of candidate routes. Thus, multiple sets of candidate routes may be generated based on several binary solutions. Further, a set of candidate routes generated based on a binary solution may be different from another set of candidate routes that may be generated based on a different binary solution. Thus, many candidate routes may be generated based on variations in the binary solutions (which may be obtained based on adjustment of the weights assigned to individual objective functions). A final solution that includes a set of optimal routes may be determined from multiple sets of candidate routes by solving another optimization problem such as a Set Portioning Problem (SPP). The determined set of optimal routes may be rendered as a recommendation for delivery of items by a plurality of vehicles. The plurality of vehicles may be assigned with routes from the set of optimal routes for the delivery of items based on a response received to the recommendation (for the plurality of vehicles).

Embodiments of the present disclosure are explained with reference to the accompanying drawings.

FIG. 1 is a diagram representing an example environment related to route generation for a Vehicle Routing Problem (VRP) and variants thereof, in accordance with at least one embodiment described in the present disclosure. With reference to FIG. 1, there is shown a network environment 100. In the network environment 100, there is shown a system 102, a user device 104, and an optimization solver machine 106. The system 102, the user device 104, and the optimization solver machine 106 may communicate with each other via a communication network 108. The system 102 may store a database 110. There is further shown a user 112 who may be associated with the user device 104.

The system 102 may be a part of an on-premises computing environment associated with the user 112 or a cloud computing environment. The system 102 may include suitable logic, circuitry, and interfaces that may be configured to solve an optimization problem such as an instance of the VRP. An example of an environment with delivery locations and vehicles is shown via a map 114. An exemplary vehicle routing environment may include a depot, a set of locations (for example, warehouse or customer locations), and a plurality of vehicles (for example, transport vehicles). To solve the optimization problem, the system 102 may generate a set of location clusters by partitioning the set of locations using a solution obtained from the optimization solver machine 106 and may generate a set of candidate routes based on the set of location clusters. The plurality of vehicles may traverse a set of optimal routes (from the set of candidate routes) to transport goods or items, or to perform any other desired task(s), to a plurality of destination locations (e.g., warehouse locations or customer locations). The usage of the optimal routes by the plurality of vehicles may result in transportation of goods or items in the shortest amount of time and minimization of transportation cost involved. The usage of the optimal routes may further ensure that each location of the set of locations in the vehicle routing environment is visited once by a vehicle. The set of optimal routes may be further generalized for all variants of VRP. Examples of the system 102 may include, but may not be limited to, a server, a workstation, an edge device, or a decentralized system that uses a distributed ledger.

The user device 104 may include suitable logic, circuitry, and interfaces that may be configured to render on a display device a set of optimal routes or route recommendations for the plurality of vehicles. The set of optimal routes or the route recommendations may be rendered on an electronic user interface of the user device 104. The routes may be traversed by the plurality of vehicles for the delivery of goods or items. The user device 104 may include a suitable network interface for reception (from the system 102 via the communication network 108) of control instructions associated with the rendering of the set of optimal routes and the route recommendations. In at least one embodiment, the system 102 may include the user device 104 as part of the on-premises computing environment. In certain embodiments, the functionalities of the user device 104 may be incorporated in its entirety or at least partially in the system 102, without a departure from the scope of the disclosure. Examples of the user device 104 may include, but are not limited to, a mobile device, a desktop computer, a laptop, a computer workstation, or a server, such as a cloud server. The user device 104 may be implemented using hardware including a processor, a microprocessor (e.g., to perform or control performance of one or more operations), a field-programmable gate array (FPGA), or an application-specific integrated circuit (ASIC). In some other instances, the user device 104 may be implemented using a combination of hardware and software.

In one or more embodiments of the disclosure, the optimization solver machine 106 may be implemented as a generalized quantum computing device that may be hosted on a cloud optimization system. The cloud optimization system may be implemented as one of a private cloud, a public cloud, or a hybrid cloud. In such an implementation, the generalized quantum computing device may use specialized optimization solving software applications (e.g., a QUBO solver) at an application layer to implement searching algorithms or meta-heuristic algorithms, such as simulated annealing or quantum annealing to search for the solution of the QUBO formulation from a discrete solution space.

The generalized quantum computing device may be different from a digital bit-based computing device, such as digital devices that are based on transistor-based digital circuits. The generalized quantum computing device may include one or more quantum gates that use quantum bits (hereinafter referred to as "qubits") to perform computations for different information processing applications, such as quantum annealing computations for solving the QUBO formulation. In general, a qubit can represent "0", "1", or a superposition of both "0" and "1". In most cases, the generalized quantum computing device may need a carefully controlled cryogenic environment to function properly. The generalized quantum computing device uses certain properties found in quantum mechanical systems, such as quantum fluctuations, quantum superposition of its Eigenstates, quantum tunneling, and quantum entanglement. These properties may help the generalized quantum computing device to perform computations for solving certain mathematical problems (e.g., QUBO functions) which are computationally intractable by conventional computing devices. Examples of the generalized quantum computing device may include, but are not limited to, a silicon-based nuclear spin quantum computer, a trapped ion quantum computer, a cavity quantum-electrodynamics (QED) computer, a quantum computer based on nuclear spins, a quantum computer based on electron spins in quantum dots, a superconducting quantum computer that uses superconducting loops and Josephson junctions, and nuclear magnetic resonance quantum computer.

In some embodiments, the optimization solver machine 106 may be a quantum annealing computer that may be specifically designed and hardware/software optimized to implement searching algorithms or meta-heuristic algorithms, such as simulated annealing or quantum annealing. Like the generalized quantum computing device, the quantum annealing computer may also use qubits and may require a carefully controlled cryogenic environment to function properly.

In some other embodiments, the optimization solver machine 106 may be a digital quantum-computing processor for solving the QUBO formulation. More specifically, the optimization solver machine 106 may be a digital annealer that may be based on a semiconductor-based architecture. The digital annealer may be designed to model the functionality of the quantum annealing computer on a digital circuitry. The digital annealer may operate at room temperature and may not require cryogenic environment to function. Also, the digital annealer may have a specific form factor that may allow it to fit on a circuit board that may be small enough to slide into the rack of a computing device or a computing infrastructure, such as a data center.

In some other embodiments, the optimization solver machine 106 may include a processor to execute software instructions associated with one or more searching algorithms and/or meta-heuristic algorithms, such as simulated annealing or quantum annealing. Examples of the implementation of the processor may include, but are not limited to, a Reduced Instruction Set Computing (RISC) processor, an Application-Specific Integrated Circuit (ASIC) processor, a Complex Instruction Set Computing (CISC) processor, a Graphical Processing Unit (GPU), a Co-processor, and/or a combination thereof.

The communication network 108 may include a communication medium through which the system 102, the user device 104, and the optimization solver machine 106 may communicate with each other. The communication network 108 may be one of a wired connection or a wireless connection. Examples of the communication network 108 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The database 110 may be configured to store information associated with the vehicle routing problem (for example, information about the plurality of vehicles and information about the set of locations). The database 110 may also store information associated with a set of location clusters and information associated with a set of candidate routes. The database 110 may be a relational database, a non-relational database, or a set of files in conventional or big-data storage. The database 110 may be stored or cached on a device, such as a server or an electronic device included in the system 102. In some embodiments, the database 110 may be hosted on a plurality of servers stored at same or different locations. The operations of the database 110 may be executed using hardware including a microprocessor (e.g., to perform or control performance of one or more operations), a processor, a field-programmable gate array (FPGA), or an application-specific integrated circuit (ASIC). In some other instances, the database 110 may be implemented using software.

In operation, the system 102 may receive data associated with the vehicle routing problem. In accordance with an embodiment, the received data may include first information about a plurality of vehicles in a geographical region. For example, the plurality of vehicles may include vehicles 118A and 118B in the geographical region. The received data may further include second information about a set of locations that may be included in the geographical region. The plurality of vehicles may be required to serve the set of locations. For example, the set of locations may include locations 120A . . . 120H which may correspond to customer locations or locations of a set of warehouses in the geographical region. The plurality of vehicles may transport goods or items from a central depot (for example, a depot 116) to each location of the set of locations via a set of optimal routes. The set of optimal routes may need to be determined for solving the VRP.

The first information may include, for example, a count of the vehicles, a vehicle type (e.g., a truck with a load bearing capacity) of each vehicle, a fuel requirement of each vehicle for transporting items to a location, a capacity of each vehicle of the plurality of vehicles, and the like. In accordance with an embodiment, the capacity of a vehicle may be treated as a constraint since a total quantity of items that the vehicle can carry may be limited by the capacity of the vehicle. The second information may include, for example, a number of the locations in the set of locations, a number of paths that exists between each pair of locations, a distance between each pair of locations, a shortest path between each pair of locations, a presence of at least one location of the set of locations between a path that connects a pair of locations, an angle between each pair of locations, a demand for items (specified in terms of weight in units such as kilograms, tons, or pounds) at each location of the set of locations, and the like. In accordance with an embodiment, the demand may correspond to a constraint associated with the location. The demand at a location may qualify as a constraint since the location may be assigned to a location cluster based on the demand at the location.

The system 102 may further determine a formulation of a multi-objective clustering problem based on the data. The multi-objective clustering problem may be formulated to partition the set of locations into a set of location clusters such that a subset of locations (for example, the locations 120A, 120B, 120C, and 120D) of the set of locations (for example, the set of locations 120A . . . 120H) is assigned to each location cluster of the set of location clusters. The multi-objective clustering problem may include a plurality of objective functions. The multi-objective clustering problem may include a set of constraints that may be applicable to each of the plurality of objective functions. The system 102 may minimize each of the plurality of objective functions while satisfying the set of constraints.

In accordance with an embodiment, the multi-objective clustering problem may include two objective functions, viz., a first objective function and a second objective function. The first objective function may be a function of a distance between each pair of locations that may be assigned to a particular location cluster of the set of location clusters. The second objective function may be a function of an angle between each pair of locations assigned to a particular location cluster of the set of location clusters. Any optimal solution for the multi-objective clustering problem must minimize (or maximize) both the first and the second objective functions without violating the set of constraints.

The system 102 may convert the multi-objective clustering problem formulation into a Quadratic Unconstrained Binary Optimization (QUBO) formulation. In accordance with an embodiment, the multi-objective clustering problem formulation may be modelled as a QUBO formulation based on a weighted summation heuristic. Each of the plurality of objective functions of the multi-objective clustering problem may be assigned with weight parameters to generate a plurality of weighted objective functions. In accordance with an embodiment, the system 102 may generate a summation of the plurality of weighted objective functions for conversion of the multi-objective clustering problem formulation into the QUBO formulation. For example, the system 102 may associate the first objective with a first weight parameter (to generate a first weighted objective function) and the second objective function with a second weight parameter (to generate a second weighted objective function). The system 102 may further generate a summation of the weighted first objective function and the weighted second objective function to convert the multi-objective clustering problem formulation into the QUBO formulation. Alternatively, the formulation of the multi-objective clustering problem may be converted into an Ising formulation. To obtain the QUBO formulation or the Ising formulation, integer variables may have to be represented using a vector with binary variables. The QUBO formulation may be a compatible input format for the optimization solver machine 106 and may include a square matrix (Q a positive definite matrix) of constants. The value of the square matrix (Q) may be associated with a vector of binary variables (i.e., Boolean variables that encode the problem) which may be obtained from the set of objective functions and the constraints of the multi-objective clustering problem.

The system 102 may generate a binary solution by solving the QUBO formulation on the optimization solver machine 106. By way of example, and not limitation, the QUBO formulation may be submitted via one or more application programming interface (API) calls to the optimization solver machine 106. These API calls may be used to deliver a request from the system 102 to the optimization solver machine 106 and relay a response to the request from the optimization solver machine 106 to the system 102. The optimization solver machine 106 may receive the QUBO formulation and may determine a solution of the submitted QUBO formulation from a discrete solution space.

The binary solution may indicate whether each location of the set of locations belongs to a location cluster of the set of location clusters. In accordance with an embodiment, the binary solution may be generated based on a minimization of the QUBO formulation. The QUBO formulation may be minimized such that the set of constraints are satisfied.

In one or more embodiments, a plurality of binary solutions may be generated by varying the weight parameters associated with the plurality of objective functions. Each of the plurality of binary solutions may be a Pareto-optimal solution. The variations of the weight parameters may be such that sum of the weight parameters is always a constant number. For example, the system 102 may vary the first weight parameter and the second weight parameter such that the sum of the first weight parameter and the second parameter is a constant. This may ensure that there is a trade-off between minimization of the pairwise distance (first objective function) and minimization of the pairwise angle (second objective function) on the Pareto-optimal front based on the variations of the first and second weight parameters.

The system 102 may partition the set of locations into a set of location clusters based on the binary solution. For example, the set of locations 120A . . . 120H may be partitioned into location clusters 122A and 122B based on the binary solution. The locations 120A, 120B, 120C, and 120B may belong to the location cluster 122A, and the locations 120E, 120F, 120G, and 120H may belong to the location cluster 122B. The pairwise distance and the pairwise angle between locations assigned to a particular location cluster may be lower compared to pairwise distance and pairwise angle between locations assigned to different location clusters. For example, pairwise distance and pairwise angle between the locations 120A and 120E may be greater compared to pairwise distances and pairwise angles between the location 120A and each of the locations 120B, 120C, and 120D.

The partitioning of the set of locations into the set of location clusters may split the VRP into a set of sub-problems. Each sub-problem may constitute determination of a candidate route associated with a location cluster of the set of location clusters. The splitting of the VRP into the set of sub-problems may be necessary for reducing the time complexity and the computational complexity of the VRP, which may typically increase based on a number of locations in a vehicle routing environment. Typically, the time complexity and the computational complexity may increase further based on the set of constraints of the multi-objective clustering problem, and constraints (such as the capacity of a vehicle and the demand at a location) associated with the plurality of vehicles and the set of locations. The time and computational complexity of the VRP may necessitate inclusion of complex hardware for determination of a solution of the VRP. The splitting of the VRP into the set of sub-problems may be achieved by the partitioning of the set of locations into the set of location clusters. For example, if the set of locations includes 100 locations, then partitioning of the set of locations into 10 location clusters may allow splitting of the VRP into 10 sub-problems. If locations of the set of locations is partitioned such that number of locations per cluster is same, then the VRP may be split into 10 sub-problems of similar time complexity. The solution of the sub-problems may require determination of 10 candidate routes.

The system 102 may further generate a set of candidate routes for the plurality of vehicles based on the set of location clusters. For example, the set of candidate routes may include candidate routes 124A and 124B, which may be generated for the transport vehicles 118A and 118B based on the location clusters 122A and 122B. Each candidate route may be used by a vehicle to transport items to locations assigned to a location cluster. The candidate route 124A may be used by the vehicle 118A to transport items at all locations (i.e., locations 120A, 120B, 120C, and 120D) that may be assigned to the location cluster 122A. Similarly, the candidate route 124B may be used by the vehicle 118B to transport items at all locations (i.e., locations 120E, 120F, 120G, and 120H) that may be assigned to the location cluster 122B. Each candidate route (124A or 124B) may originate and terminate at the depot 116. The distance traversed by the transport vehicle 118A using the candidate route 124A to visit the locations 120A, 120B, 120C, and 120D of the location cluster 122A may be lowest as compared to distances that may have to be traversed to visit the locations 120A, 120B, 120C, and 120D using other routes.

The candidate routes may enable the vehicles to transport items to respective locations at a minimum transport cost (e.g., due to more fuel/energy savings or quick arrivals at respective locations from the depot). The determination of each candidate route may be performed based on a solution of a route generation problem (for example, a travelling salesman problem). In some embodiments, each sub-problem (i.e., a determination of a candidate route of the set of candidate routes) may be solved serially using a single travelling salesman problem solver. In some other embodiments, the set of sub-problems may be solved in parallel using multiple travelling salesman problem solvers.

The system 102 may control the user device 104 to render at least one route recommendation for the plurality of vehicles based on the set of candidate routes. In accordance with an embodiment, the set of locations may be partitioned into a set of location clusters for each binary solution. Further, a set of candidate routes may be generated for the plurality of vehicles based on the set of location clusters. Thus, multiple sets of candidate routes may be generated based on a plurality of binary solutions and may be collated into a consolidated set of candidate routes. The system 102 may further solve a set partition problem to determine a set of optimal routes from the consolidated set of candidate routes. The set of optimal routes may be treated as a final solution of the VRP. Based on a solution of the set partition problem, the system 102 may control the user device 104 to render at least one optimal route of the set of optimal routes as a recommendation for each vehicle of the plurality of vehicles. For example, if the candidate route 124A is determined as an optimal route based on a solution of the set partition problem, then the system 102 may control the user device 104 to recommend the candidate route 124A for the transport vehicle 118A.

Modifications, additions, or omissions may be made to FIG. 1 without departing from the scope of the present disclosure. For example, the network environment 100 may include more or fewer elements than those illustrated and described in the present disclosure.

Figure 2:
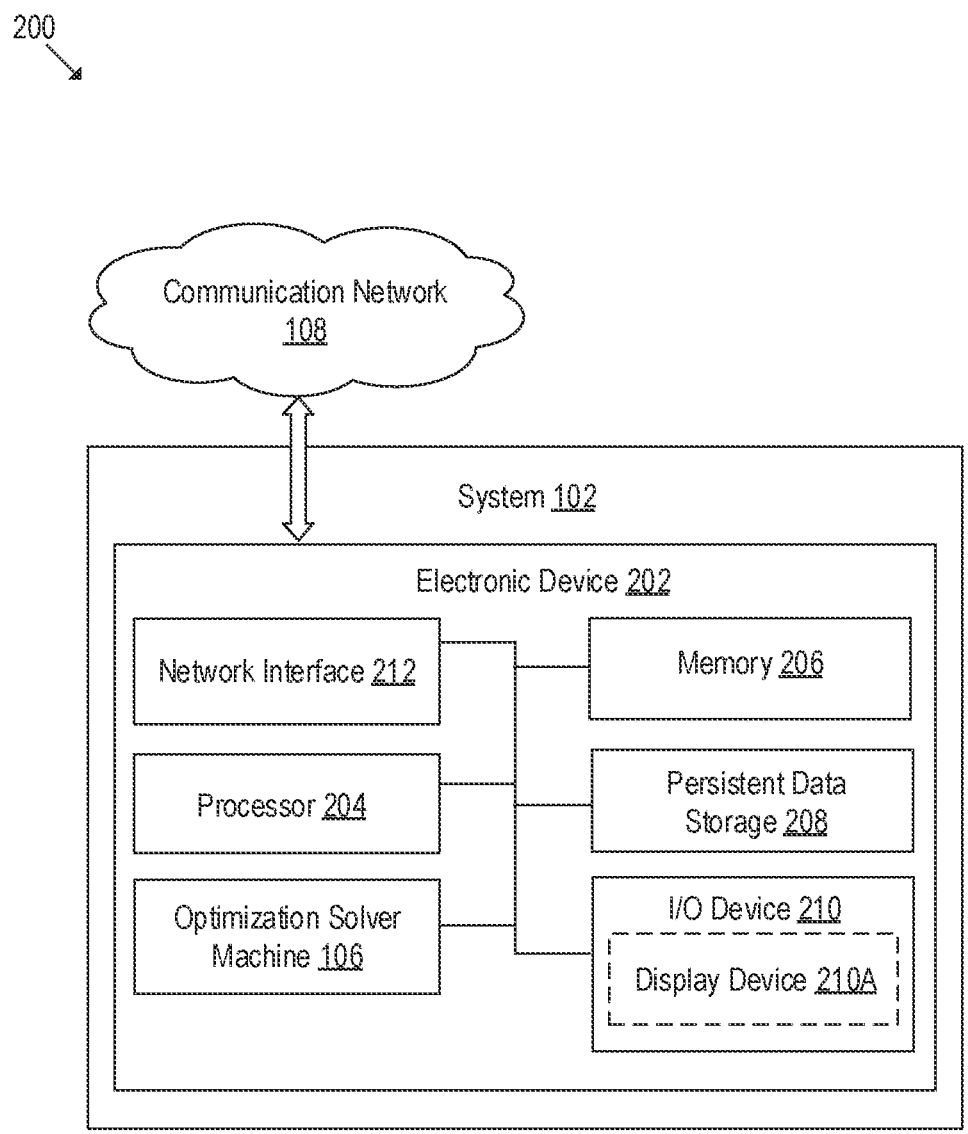
FIG. 2 is a block diagram that illustrates an exemplary system for generation of routes for a VRP and variants of VRP based on solutions of a multi-objective clustering problem and a route generation problem.

FIG. 2 is a block diagram that illustrates an exemplary system for generation of routes for a VRP and variants of VRP based on solutions of a multi-objective clustering problem and a route generation problem, in accordance with at least one embodiment described in the present disclosure. FIG. 2 is explained in conjunction with elements from FIG. 1. With reference to FIG. 2, there is shown a block diagram 200 of a system 102 that includes an electronic device 202. The electronic device 202 may include a processor 204, a memory 206, a persistent data storage 208, an input/output (I/O) device 210, a network interface 212 and the optimization solver machine 106. In at least one embodiment, the I/O device 210 may include a display device 210A.

In some embodiments, functionalities of the user device 104 may be incorporated in its entirety in the electronic device 202, without a departure from the scope of the disclosure. Examples of the electronic device 202 may include, but are not limited to, a computing device, a hardware-based annealer device, a digital-annealer device, a quantum-based or quantum-inspired annealer device, a smartphone, a cellular phone, a mobile phone, a gaming device, a mainframe machine, a server, a computer workstation, and/or a consumer electronic (CE) device.

The processor 204 may include suitable logic, circuitry, and interfaces that may be configured to execute a set of instructions stored in the memory 206. The processor 204 may be configured to execute program instructions associated with different operations to be executed by the system 102 or the electronic device 202. Exemplary operations of the system 102 may include reception of data, associated with a VRP, that include first information about a plurality of vehicles in a geographical region and second information about a set of locations that the plurality of vehicles may be required to serve. The operations may further include determination of a formulation of a multi-objective clustering problem based on the data. The operations may further include conversion of the formulation into a QUBO formulation. The operations may further include generation of a binary solution based on a solution of the QUBO formulation on an optimization solver machine. The operations may further include partitioning of the set of locations into a set of location clusters based on the binary solution. The operations may further include generation of a set of candidate routes for the plurality of vehicles based on the set of location clusters. The operations may further include control of the user device 104 to render at least one route recommendation for the plurality of vehicles based on the set of candidate routes.

The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

Although illustrated as a single processor in FIG. 2, the processor 204 may include any number of processors configured to, individually or collectively, perform or direct performance of any number of operations of the system 102 electronic device 202, as described in the present disclosure. In some embodiments, the processor 204 may be configured to interpret and/or execute program instructions and/or process data stored in the memory 206. After the program instructions are loaded into memory 206, the processor 204 may execute the program instructions.

The memory 206 may include suitable logic, circuitry, and interfaces that may be configured to store the one or more instructions to be executed by the processor 204. The one or more instructions stored in the memory 206 may be executed by the processor 204 to perform the different operations of the system 102 (or the electronic device 202). The memory 206 may further store the data associated with the VRP (i.e., the first information and the second information). The memory 206 may further store a plurality of objective functions and a formulation of the multi-objective clustering problem, and a set of constraints that may be applicable for construction of the multi-objective clustering problem. The memory 206 may further store solutions of the QUBO formulation and a solution of a route generation problem. The solution of the QUBO formulation may include information associated with a set of location clusters that may be generated based on partitioning of the set of locations. The solution of the route generation problem may include a set of candidate routes (that may be generated based of the set of location clusters) for transportation of items by the plurality of vehicles. The memory 206 may further store a set of optimal routes determined based on the set of candidate routes. Exemplary implementations of the memory 206 may include, but may not be limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into memory 206, the processor 204 may execute the program instructions.

The I/O device 210 may include suitable logic, circuitry, and interfaces that may be configured to receive an input from the user 112 and provide an output based on the received input. For example, the I/O device 210 may receive, as input, the first information and the second information. In some embodiments, the I/O device 210 may receive a plurality of weight parameters (as a user input from the user 112) that may be required to be associated with objective functions for conversion of the multi-objective clustering problem formulation into the QUBO formulation. Further, the I/O device 210 may render, based on selection of routes from the set of candidate routes, a set of optimal routes that correspond to a solution of the VRP and recommendations of optimal routes of the set of optimal routes for the plurality of vehicles. The I/O device 210 which may include various input and output devices, may be configured to communicate with the processor 204. Examples of the I/O device 210 may include, but are not limited to, a touch screen, a keyboard, a mouse, a joystick, a microphone, the display device 210A, and a speaker.

The display device 210A may include suitable logic, circuitry, and interfaces that may be configured to render the set of optimal routes and the recommendations of routes of the set of optimal routes. In at least one embodiment, the display device 210A may correspond to a display screen of the user device 104. The display device 210A may be a touch screen which may enable a user to provide a user-input via the display device 210A. The touch screen may be at least one of a resistive touch screen, a capacitive touch screen, or a thermal touch screen. The display device 210A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210A may refer to a display screen of a head mounted device (HMD), a smart-glass device, a see-through display, a projection-based display, an electro-chromic display, or a transparent display.

The network interface 212 may include suitable logic, circuitry, and interfaces that may be configured to facilitate communication between the processor 204, the user device 104, and the optimization solver machine 106, via the communication network 108. The network interface 212 may be implemented by use of various known technologies to support wired or wireless communication of the electronic device 202 (or the system 102) with the communication network 108. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 212 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging, and a Short Message Service (SMS).

Modifications, additions, or omissions may be made to the example electronic device 202 without departing from the scope of the present disclosure. For example, in some embodiments, the example electronic device 202 may include any number of other components that may not be explicitly illustrated or described for the sake of brevity.

Figure 3:
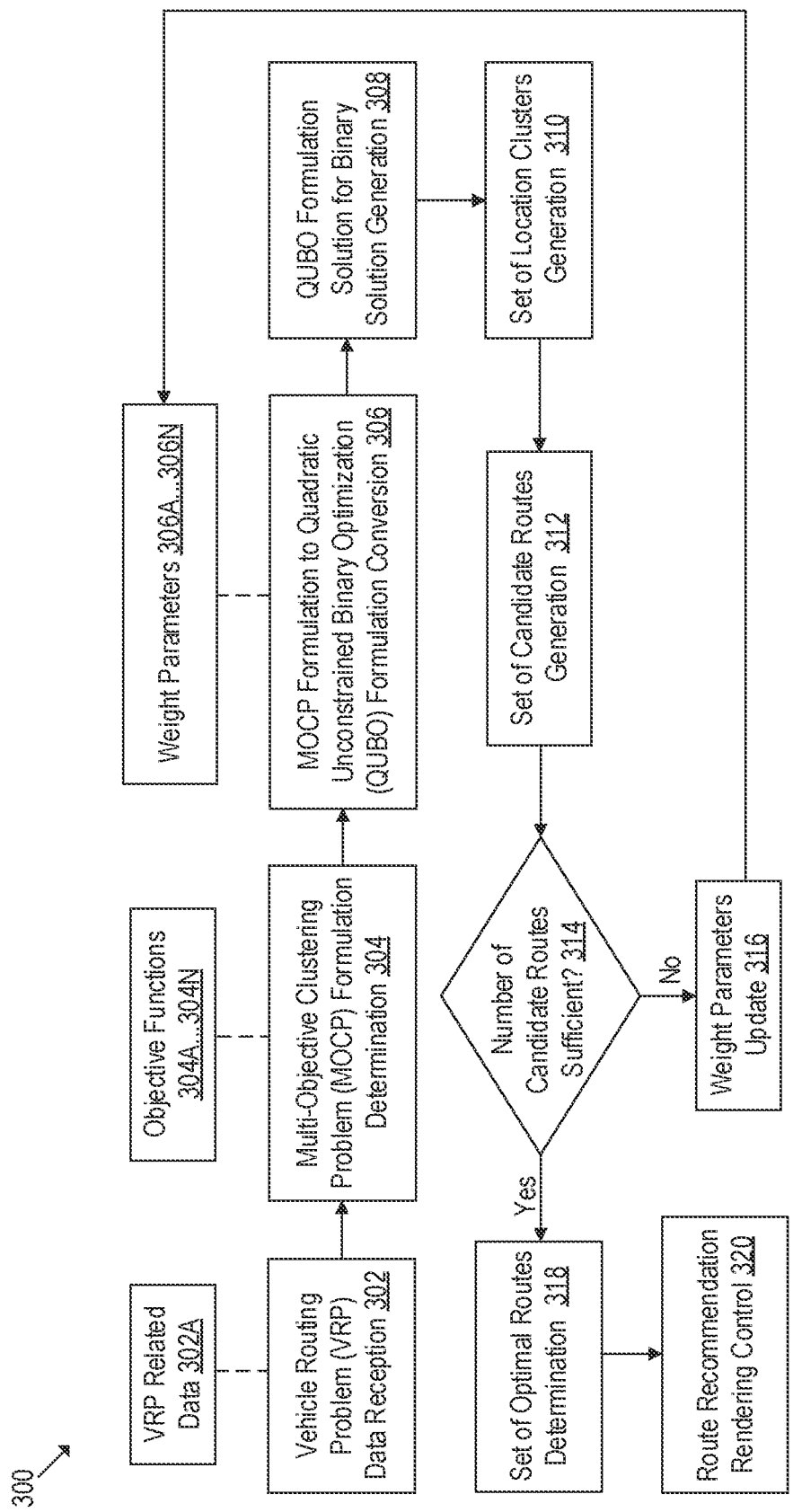
FIG. 3 is a diagram that illustrates an execution pipeline for generation of routes for a VRP and variants thereof.

FIG. 3 is a diagram that illustrates an execution pipeline for generation of routes for a VRP and variants thereof, in accordance with at least one embodiment described in the present disclosure. FIG. 3 is described in conjunction with elements from FIG. 1, and FIG. 2. With reference to FIG. 3, there is shown an execution pipeline 300. The exemplary execution pipeline 300 may include a set of operations (for example, operations from 302 to 320) that may be executed by one or more components of FIG. 1, such as the system 102. The set of operations may be performed by the processor 204 of the system 102.

At 302, data 302A associated with the VRP may be received. VRP may be a NP-hard combinatorial optimization problem whose solution may require determination of a set of optimal routes for transportation of items at a set of locations in a geographical region. There may exist a plurality of variants of the VRP (for example, capacitated VRP (CVRP), CVRP with time-widows (CVRPTW), Inventory Routing Problem (IRP), Open VRP (OVRP), and so on). Each variant may be defined by a set of constraints (for example vehicle capacity, customer demand, and time window for delivery of customer demand, and so on) and, therefore, solution of a particular variant may depend on one or more constraints defining the VRP variant.

In at least one embodiment, the processor 204 may be configured to receive the data 302A associated with the VRP. The data 302A may include first information about a plurality of vehicles in a geographical region and second information about a set of locations that the plurality of vehicles may be required to serve. The first information may include, for example, a count of vehicles, a vehicle type (e.g., a vehicle with a particular load bearing capacity), a cost that may be incurred in using each vehicle of the plurality of vehicles for transportation of items, and the like. The second information may include, for example, a number of locations in the set of locations, a number of paths that may exist between each pair of locations, a distance between each pair of locations, a shortest path between each pair of locations, an angle between each pair of locations, a presence of intermediate location(s) in one or more paths between each pair of locations, and the like.

In accordance with an embodiment, the data 302A may further include a first constraint associated with the plurality of vehicles and a second constraint associated with the set of locations. For example, the first constraint may be a capacity constraint and the second constraint may be a demand constraint. The capacity constraint may indicate a maximum quantity of items or a maximum weight that the vehicle can carry during a trip. The trip may originate from the central depot (i.e., a location to the plurality of vehicles), pass through with a subset of locations of the set of locations, and terminate at the central depot. Each vehicle may have a capacity "Q" (i.e., each vehicle may be able to carry "Q" pounds of items). For a location of the set of locations, the demand constraint may indicate a quantity of items that may be required to be unloaded at the location. The number of locations in the set of locations may be "n", and demand at each location of the set of locations may be "qi", "i"=1 . . . n.

VRP may be solved using a Cluster-First Route-Second approach that includes partitioning of the set of locations into a set of location clusters and generation of a set of candidate routes from the set of location clusters. The set of locations may be partitioned into multiple subsets of locations. Each subset of locations may be assigned to a different location cluster. Each candidate route may be used for transportation of items across a subset of locations that may be assigned to each location cluster. A candidate route may originate and terminate at the central depot and may include a subset of locations along the candidate route. A vehicle with a capacity "Q" may use a candidate route to transport items to a subset of locations assigned to a location cluster, provided a total demand at the subset of locations does not exceed the capacity of the vehicle "Q". The solution of the VRP may be generalized for all variants of VRP since a candidate route of the set of candidate routes may minimize a cost that may be incurred by a vehicle for transportation of items on a trip. The cost may be based on factors that include, for example, a distance travelled during the trip, a time spent to complete the trip, or an amount of fuel that may be required for the trip. Once the data 302A is received (or determined), a multi-objective clustering problem may be formulated.

At 304, a formulation of a multi-objective clustering problem may be determined based on the data 302A. In at least one embodiment, the processor 204 may be configured to determine the formulation of the multi-objective clustering problem. The formulation of the multi-objective clustering problem may be determined based on a plurality of objective functions 304A ... 304N that may be included in the multi-objective clustering problem. Each objective function of the plurality of objective functions 304A ... 304N may be a function of a parameter (for example, distance or angle) determined based on the data 302A. The processor 204 may be configured to select values of one or more parameters (that are determined based on the data 302A) associated with each objective function of the plurality of objective functions 304A ... 304N to minimize the corresponding objective function. The selection may be based on a set of constraints that may be applicable to the corresponding objective function. Based on the minimization of the objective function, an optimal partitioning of the set of locations into the set of location clusters may be obtained.

In accordance with an embodiment, the plurality of objective functions 304A ... 304N may include a distance-based objective function 304A to minimize an intra-cluster pair-wise distance between each pair of locations of the set of locations. The distance-based objective function 304A may be formulated as a function of a distance between each pair of locations of the set of locations that may be assigned to a particular cluster of the set of clusters. The processor 204 may be configured to minimize a formulation of the distance-based objective function 304A to obtain an optimal partitioning of the set of locations into the set of location clusters. Based on the optimal partitioning, a subset of locations of the set of locations may be assigned to each location cluster of the set of location clusters such that the set of constraints are satisfied. For example, the optimal partitioning of the set of locations (i.e., "n" locations) may result in a generation of "m" location clusters or "m" subsets of locations and each of the "m" subsets of locations may be assigned to a location cluster.

In accordance with an embodiment, the distance-based objective function 304A (for example, "$OF_{Distance}$") may be formulated using equation (1), which is given as follows:

$$OF_{Distance} = \min \sum_{k=1}^{m} \sum_{i=1}^{n} \sum_{j=1}^{n} D_{i,j} \ x_{i,k} x_{j,k} \quad (1)$$

In equation (1), the intra-cluster pairwise distance between a pair of locations of the set of locations may be represented as $D_{i,j}$. The pair of locations may correspond to locations "i" and "j". The pair of locations may be assigned to a $k^{th}$ location cluster. "$x_{i,k}$" may be a binary variable that indicates whether the location "i" is assigned to the "$k^{th}$" location cluster, and "$x_{j,k}$" may be a binary variable that may indicate whether the location "j" is assigned to the "$k^{th}$" location cluster. Values of the binary variables $x_{i,k}$ and $x_{j,k}$ may be set as "1", if locations "i" and "j" are assigned to the "$k^{th}$" location cluster. On the other hand, the values of the binary variables $x_{i,k}$ and $x_{j,k}$ may be set as "0", if the locations "i" and "j" are not assigned to the "$k^{th}$" location cluster.

Based on the equation (1), it can be observed that "$OF_{Distance}$" may be minimized based on an assignment of a subset of locations (of the "n" locations) to each location cluster of the set of location clusters (i.e., the "m" location clusters). For example, locations "i" and "j" may belong to a subset of locations that may be assigned to a location cluster (i.e., the "$k^{th}$" location cluster). The assignment of the locations "i" and "j" to the same cluster ("$k^{th}$" location cluster) may be performed because, both binary variables $x_{i,k}$ and $x_{j,k}$ may not be "1" if the locations "i" and "j" are assigned to different location clusters. Further, the assignment of the subset of locations to each location cluster may be such that a pair-wise distance between each pair of locations of the subset of locations is a minimum.

In accordance with an embodiment, the plurality of objective functions 304A ... 304N may include an angle-based objective function 304B to minimize an intra-cluster pair-wise angle between each pair of locations of the set of locations. The angle-based objective function 304B may be formulated as a function of an angle between each pair of locations of the set of locations that may be assigned to a particular location cluster. The processor 204 may be configured to also minimize the formulation of the angle-based objective function 304B to obtain an optimal partitioning of the set of locations into the set of location clusters. The angle-based objective function 304B (for example, "$OF_{Angle}$") may be represented using an equation (2), which is given as follows:

$$OF_{Abgle} = \min \sum_{k=1}^{m} \sum_{i=1}^{n} \sum_{j=1}^{n} D_{i,j} \ x_{i,k} x_{j,k} \quad (2)$$

In equation (2), an intra-cluster pairwise angle between a pair of locations (for example, the locations "i" and "j") may be represented as $A_{i,j}$. Based on the equation (2), it can be observed that "$OF_{Angle}$" may be minimized based on assignment of a subset of locations (of the "n" locations) to each location cluster of the set of location clusters (i.e., the "m" location clusters). Further, the assignment of the subset of locations to each location cluster may be performed such that a pair-wise angle between each pair of locations of the subset of locations is a minimum.

In accordance with an embodiment, the processor 204 may minimize the distance-based objective function 304A and the angle-based objective function 304B based on a constraint (for example, a third constraint) of the set of constraints. The third constraint may require that each location of the set of locations is uniquely assigned to a location cluster of the set of location clusters. From equations (1) and (2), it can be observed that the binary values $x_{i,k}$ and $x_{j,k}$ will be "1" only if both the locations "i" and "j" are uniquely assigned to the "$k^{th}$" location cluster. The $OF_{Distance}$ and $OF_{Angle}$ may be minimized only if the binary values $x_{i,k}$ and $x_{j,k}$ are "1" (i.e., if the third constraint is satisfied). The third constraint may be represented using equation (3), which is given as follows:

$$\sum_{k=1}^{m} x_{i,k} = 1 \text{ or } \sum_{k=1}^{m} x_{j,k} = 1 \quad (3)$$

From equation (3), it can be observed that each location may be uniquely assigned to a particular location cluster (i.e., a unique cluster).

In accordance with an embodiment, the processor 204 may minimize the distance-based objective function 304A and the angle-based objective function 304B based on another constraint (for example, a fourth constraint) of the set of constraints. The fourth constraint may require that a difference in total demands between a pair of location clusters of the set of location clusters is below a demand threshold. The "$OF_{Distance}$" and "$OF_{Angle}$" may be minimized such that the fourth constraint is satisfied. The fourth constraint may be represented using equation (4), which is given as follows:

$$\sum_{i=1}^{n} q_i x_{i,k} \leq (1+\delta) \frac{\sum_{i=1}^{n} q_i}{m}, \forall k = 1, \ldots m \quad (4)$$

The left-hand-side of equation (4) may specify demand at a subset of locations of a location cluster. The subset of locations may be assigned to the "$k^{th}$" location cluster. The binary variable "$x_{i,k}$" may be used to ignore demand at locations of the set of locations (i.e., the "n" locations) that are not included in the subset of locations.

$$\sum_{i=1}^{n} q_i$$

on the right-hand-side of equation (4) may specify the demand at the set of "n" locations. If the set of "n" locations is partitioned into "m" location clusters, then a fraction $$\frac{\sum_{i=1}^{n} q_i}{m}$$

may approximate demand at each subset of locations of the set of "n" locations.

$$\delta \times \frac{\sum_{i=1}^{n} q_i}{m}$$

may represent a demand threshold ("$\delta$" may be tolerance factor). The fourth constraint may ensure that assignment of the locations to the set of location clusters is such that differences in total demands between each pair of location clusters is a minimum. The multi-objective clustering problem may be formulated based on the objective functions specified in equations (1) and (2). These functions may be minimized to satisfy the set of constraints specified in equations (3) and (4).

At 306, the multi-objective clustering problem formulation may be converted to a QUBO formulation. In an embodiment, the processor 204 may be configured to convert the multi-objective clustering problem formulation into the QUBO formulation. The conversion may be performed to leverage the optimization solver machine 106 that may be capable of solving the QUBO formulation. The QUBO formulation may include a plurality of quadratic objective functions. For instance, the distance-based objective function 304A and the angle-based objective function 304B may be formulated as quadratic objective functions (see equations (1) and (2)). To convert the multi-objective clustering problem formulation into the QUBO formulation, the processor 204 may formulate a single-objective function based on a weighted summation of the quadratic objective functions, i.e., the distance-based objective function 304A and the angle-based objective function 304B.

In accordance with an embodiment, the plurality of objective functions 304A . . . 304N of the multi-objective clustering problem may be associated with weight parameters 306A . . . 306N. The weight parameters 306A . . . 306N may be further associated with the QUBO formulation. In one or more iterations, values of the weight parameters 306A . . . 306N may be received via an input from the user 112 or the optimization solver machine 106. The processor 204 may be configured to initialize values of the weight parameters 306A . . . 306N based on the input. The QUBO formulation may be solved based on the values of the initialized weight parameters 306A . . . 306N. Specifically, the values of the weight parameters 306A . . . 306N may be treated weight coefficients of respective quadratic objective functions in the QUBO formulation. For example, "$\alpha_{Distance}$" may be a weight coefficient (for example, 306A) associated with the quadratic objective function "$OF_{Distance}$". Similarly, "Angle" may be a weight coefficient (for example, 306B) associated with the quadratic objective function "$OF_{Angle}$". The weight coefficients "$\alpha_{Distance}$" 306A and "$\alpha_{Angle}$" 306B may be associated with the quadratic objective functions "$OF_{Distance}$" and "$OF_{Angle}$" for formulation of the single-objective function (i.e., the weighted summation) of the QUBO formulation. The QUBO formulation may be represented using equation (5), which is given as follows:

$$OF_{QUBO} = \min\left[\alpha_{Distance}\sum_{k=1}^{m}\sum_{i=1}^{n}\sum_{j=1}^{n}D_{i,j}\,x_{i,k}x_{j,k} + \alpha_{Angle}\sum_{k=1}^{m}\sum_{i=1}^{n}\sum_{j=1}^{n}D_{i,j}\,x_{i,k}x_{j,k}\right] \quad (5)$$

The QUBO formulation may be solved to determine whether a location of the set of location is assigned to a location cluster of the set of location clusters.

At 308, a binary solution may be generated by solving the QUBO formulation on the optimization solver machine 106. In at least one embodiment, the processor 204 may be configured to generate the binary solution by solving the QUBO formulation (as indicated in equation (5)) on the optimization solver machine 106 (for example, a digital annealer). In accordance with an embodiment, the optimization solver machine 106 may be a hybrid configuration (i.e., may include both hardware and software components). The software component, when executed, may determine feasible regions in a solution space, which may be subsequently analyzed by the hardware component. The optimization solver machine 106 may minimize the QUBO formulation based on the initialized values of the weight coefficients "$\alpha_{Distance}$" 306A and "$\alpha_{Angle}$" 306B, the third constraint (see equations (3)), and the fourth constraint (see equation (4)) to generate the binary solution. The QUBO formulation may be minimized to generate the binary solution (which may be referred to as a first binary solution) such that the third and fourth constraints are satisfied.

In accordance with an embodiment, the first binary solution may include a set of binary values. Each binary value of the set of binary values may indicate whether a location of the set of locations is assigned to a location cluster of the set of location clusters. For example, the set of binary values be represented using equation (6), which is given as follows:

$$x_{i,k} \in \{0,1\} \forall i=1, \ldots n; k=1, \ldots m \quad (6)$$

From equation (6), it can be observed that the number of binary values in the set of binary values is "k×n". Each binary value of the set of binary values may be represented as "0" or "1". For example, a binary value "$x_{i,k}=1$" may indicate that location "i" may be assigned to the "$k^{th}$" location cluster. On the other hand, the binary value "$x_{i,k}=0$" may indicate that location "i" may not be assigned to the "$k^{th}$" location cluster.

In accordance with an embodiment, the sum of "$\alpha_{Distance}$" and "$\alpha_{Angle}$" may be a constant (for example, "1"). The values of "$\alpha_{Distance}$" 306A and "$\alpha_{Angle}$" 306B may be initialized to 0.6 and 0.4, respectively, for generation of the first binary solution. The processor 204 may be further configured to generate another binary solution based on updated values of "$\alpha_{Distance}$" 306A and "$\alpha_{Angle}$" 306B. For example, "$\alpha_{Distance}$" 306A and "$\alpha_{Angle}$" 306B may be updated to 0.55 and 0.45 respectively for generation of an updated binary solution. Thus, the processor 204 may generate a plurality of binary solutions based on updated weight coefficients. Each binary solution of the plurality of binary solutions may be a Pareto-optimal solution.

At 310, the set of locations may be partitioned into a set of location clusters based on the binary solution (i.e., the first binary solution). In at least one embodiment, the processor 204 may be configured to partition the set of locations into the set of location clusters based on the first binary solution. For example, values of m=5 and n=100 (see equation (6)) may indicate that the set of locations may include 100 locations. Based om the binary solution, the set of locations may be partitioned into 5 location clusters or 5 subsets of locations. The number of binary values in the set of binary values may be 500. Out of the 500 binary values, 100 binary values may be "1" (which may indicate assignment of each location of the set of locations to a location cluster of the set of location clusters) and remaining 400 values may be "0" (which may indicate that each location of the set of locations is uniquely assigned to a location cluster). Further, an average or a total demand in one location cluster may be approximately equal to respective demands in other clusters.

At 312, a set of candidate routes may be generated for the plurality of vehicles based on the set of location clusters. In at least one embodiment, the processor 204 may be configured to generate the set of candidate routes for the plurality of vehicles based on the set of location clusters. A vehicle of the plurality of vehicles may traverse a candidate route to transport items from the central depot to a subset of locations in the candidate route. The candidate route may originate at the central depot, pass through the subset of locations in the candidate route, and terminate at the central depot. The subset of locations may be assigned to a location cluster of the set of location clusters based on the binary solution (i.e., the first binary solution). For a subset of locations, a candidate route may be considered as an optimal route if the length of the candidate route is lowest among other candidate routes for same subset of locations.

In accordance with an embodiment, the processor 204 may determine an objective function of a route generation problem for each location cluster of the set of location clusters. For each location cluster. the objective function of the route generation problem may be formulated for determination of a candidate route using a subset of locations assigned to the corresponding location cluster. The plurality of vehicles may include "v" vehicles and a capacity of each vehicle may be "Q". A candidate route may include "p+1" steps and a number of locations in a subset of locations (in the candidate route) may be "t" (assuming that the set of locations is evenly partitioned into "m" location clusters such that "t" locations are assigned to each location cluster). A first step (i.e., "p"=1) of the candidate route may correspond to a portion of the candidate route between the central depot and a first location of the "t" locations assigned to a location cluster. The final step (i.e., "p=n+1") may correspond to a portion of the candidate route between a last location of the "t" locations assigned to a location cluster and the central depot. The objective function of the route generation problem (for generation of a candidate route) may be determined using equation (7), which is given as follows:

$$OF_{condidtae\ route} = \min \sum_{v=1}^{l} \sum_{i=o}^{t} \sum_{j=o}^{t} \sum_{p=1}^{t} C_{i,j}\ v_{v,i,p} x_{v,j,p+1} \quad (7)$$

In equation (7), "$C_{i,j}$" may represent an optimal cost for traversing a step "p" of the candidate route between each of a pair of locations "i" and "j". It should be noted that "i=0" and "j=0" for the central depot. "$x_{v,i,p}$" may be a binary variable that may indicate whether a vehicle "v" of the plurality of vehicles visits a location "i" at a step "p". Similarly, "$x_{v,j,p+1}$" may be a binary variable that may indicate whether the vehicle "v" visits a location "j" at a step "p+1". The binary variables "$x_{v,i,p}$" and "$x_{v,j,p+1}$" may be "1" if the vehicle traverses from location "i" to location "j". From equation (7), it may be observed that a cost involved in traversing from the central depot to location "i" (or location "j") or from location "i" (or location "j") to the central depot is nil.

The processor 204 may be further configured to solve the route generation problem based on a minimization of the objective function ("$OF_{candidate\ route}$") for each location cluster of the set of location clusters. The objective function ("$OF_{candidate\ route}$") may be minimized for generation of a candidate route of the set of candidate routes for the corresponding location cluster of the set of location clusters. In accordance with an embodiment, the route generation problem may be a travelling salesman problem or a variant of the travelling salesman problem. The processor 204 may minimize "$OF_{candidate\ route}$" for generation of each candidate route per location cluster such that a couple of constraints are satisfied. The constraints may require a vehicle to visit a location "j" on the corresponding candidate route or return to the central depot after the vehicle has visited the location "i". Further, a total demand at locations in a location cluster must not exceed the capacity "Q" (i.e., the capacity of the vehicle).

In some embodiments, the generation of a candidate route of the set of candidate routes for a location cluster of the set of location clusters may be followed by generation of another candidate route until all candidate routes of the set of candidate routes for respective location clusters are generated. In such scenarios, the processor 204 may use a single travelling salesman problem solver for generation of the set of candidate routes. In some other embodiments, all candidate routes of the set of candidate routes may be generated in parallel using a plurality of travelling salesman problem solvers. Thus, the set of candidate routes may be generated based on the first binary solution. The generated set of candidate routes may be referred to as a first set of candidate routes.

At 314, a sufficiency of number of candidate routes in the first set of candidate routes may be determined. In at least one embodiment, the processor 204 may be configured to determine whether the number of candidate routes in the first set of candidate routes is sufficient. The number of candidate routes generated based on the first binary solution may be compared with a threshold number of routes.

At 316, the weight parameters 306A . . . 306B may be updated based on the comparison. In at least one embodiment, the processor 204 may be configured to update the weight parameters 306A . . . 306B (for example, values of "$\alpha_{Distance}$" 306A and "$\alpha_{Angle}$" 306B) if the number of candidate routes is less than the threshold number of routes. Based on the updated values of "$\alpha_{Distance}$" 306A and "$\alpha_{Angle}$" 306B, the QUBO formulation (see equation (5))

may be updated (step 306). The updated QUBO formulation may be used to generate a second binary solution (step 308). The processor 204 may generate a second set of candidate routes based on the second binary solution (steps 310 and 312). The number of candidate routes that may be generated based on the first binary solution and the second binary solution may be compared with the threshold number of routes (step 316). If the sum of the first set of candidate routes and the second set of candidate routes is equal to or greater than the threshold number of routes, then a set of optimal routes may be determined.

At 318, the set of optimal routes may be determined based on multiple sets of candidate routes. In at least one embodiment, the processor 204 may be configured to determine the set of optimal routes based on multiple sets of candidate routes (for example, the first set of candidate routes and the second set of candidate routes). The multiple sets of candidates may be collated into one single set of candidate routes.

The processor 204 may solve a set partitioning problem to determine the set of optimal routes "R" from the consolidated set of candidate routes. To solve the set partitioning problem, the processor 204 may formulate an objective function. The objective function may be used for determination of optimal routes that may be included in "R" (i.e., the set of optimal routes). The cost that may be involved in traversing each optimal route of the set of optimal routes (by a vehicle of the plurality of vehicles) may be lowest among other routes. The objective function may be formulated using equation (8), which is given as follows:

$$OF_{SPP} = \min \sum_{r \in R} c_r^* y_r \qquad (8)$$

In equation (8), "$c_r^*$" may indicate an optimal cost for traversing a route "r" included in "R". The route "r" may be a candidate route that includes a subset of locations assigned to a location cluster of the set of location clusters (based on a binary solution of a QUBO formulation). "$y_r$" may be a binary variable that indicates whether the route "r" is an optimal route of the set of optimal routes. The processor 204 may solve the set partitioning problem to determine whether the "$y_r$" is "0" (which may indicate that "r" is not an optimal route) or "1" (which may indicate that "r" is an optimal route of the set of optimal routes).

The processor 204 may minimize "$OF_{SPP}$" such that a constraint is satisfied. The constraint may require that a location assigned to a location cluster is included in an optimal route "r" of the set of optimal routes "R". The constraint may be formulated using equation (9), which is given as follows:

$$\sum_{r \in R} a_{ir} y_r = 1 \qquad (9)$$

In equation (9), "$a_{ir}$" may represent a binary variable that may be indicative of whether a vehicle of the set of vehicle visits a location "i" (located in the route"r"). To ensure that "r∈ R" (i.e., for "r" is included in the set of optimal routes "R"), "$a_{ir}$" may be required to be "1". Thus, the set of optimal routes may be determined by solving the set portioning problem. The set of optimal routes may correspond to a final solution of the VRP.

At 320, the user device 104 may be controlled to render at least one route recommendation for the plurality of vehicles based on the set of candidate routes. In at least one embodiment, the processor 204 may be configured to control the electronic user interface of the user device 104 (or the display device 210A) to render the at least one route as a recommendation for each vehicle of the plurality of vehicles. The route may be a part of the set of optimal routes.

Figure 4:
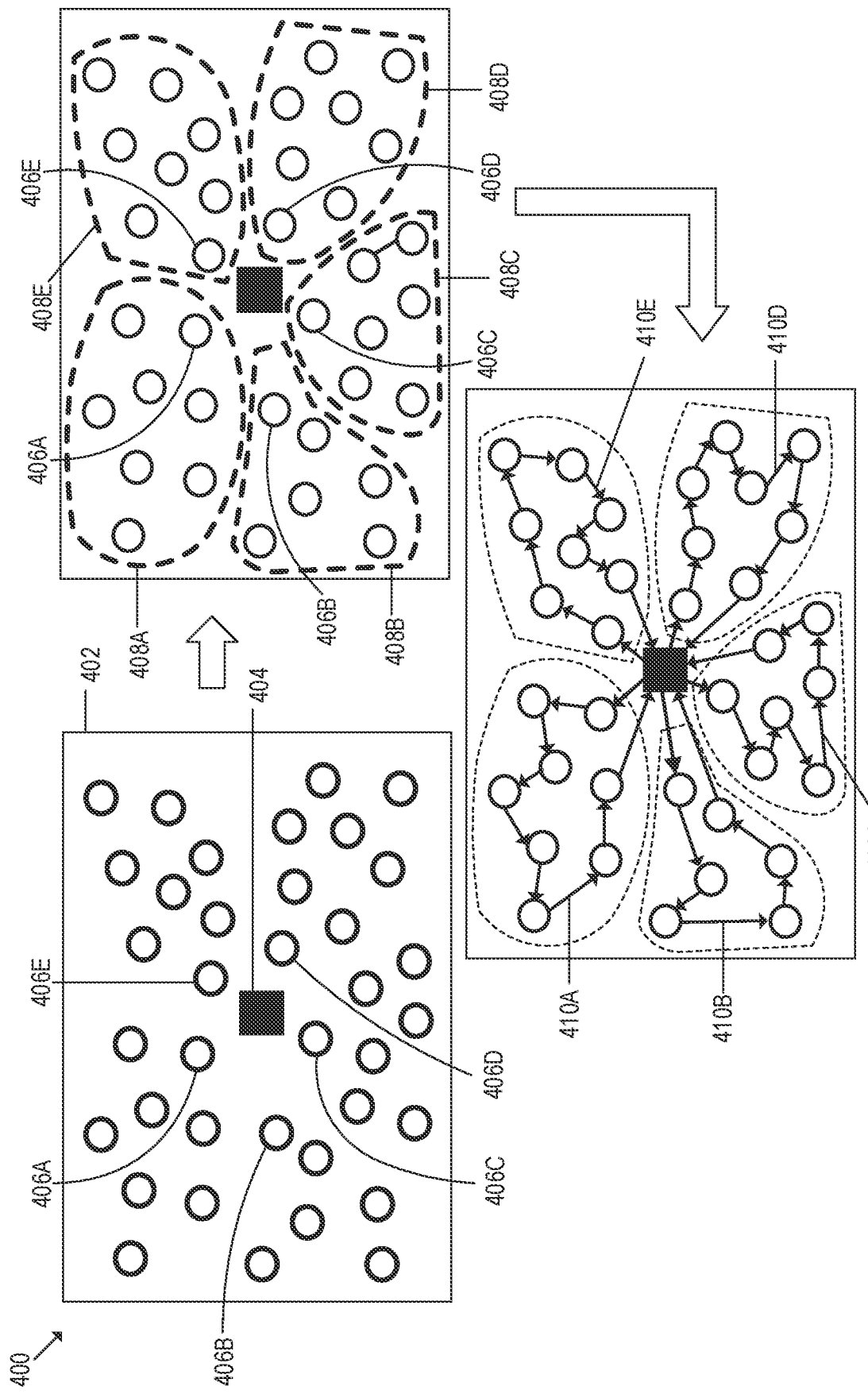
FIG. 4 is a diagram that illustrates an exemplary scenario of generation of a set of candidate routes.

FIG. 4 is a diagram that illustrates an exemplary scenario of generation of a set of candidate routes based on a set of location clusters, in accordance with at least one embodiment described in the present disclosure. FIG. 4 is described in conjunction with elements from FIG. 1, FIG. 2, and FIG. 3. With reference to FIG. 4, there is shown an exemplary scenario 400. In the exemplary scenario 40, there is shown a vehicle routing environment 402 that includes a central depot 404 and a set of locations. The set of locations may be represented as nodes of an unconnected graph. The set of locations may include locations 406A, 406B, 406C, 406D, and 406E that are closer to the central depot 404 as compared to other locations of the set of locations.

In accordance with an embodiment, the processor 204 may be configured to generate a binary solution by solving a QUBO formulation (described in FIG. 3) on the optimization solver machine 106. Based on the binary solution, the set of locations may be partitioned into a set of location clusters. The set of location clusters may include location clusters 408A, 408B, 408C, 408D, and 408E. The processor 204 may partition the set of locations such that each location of the set of locations is uniquely assigned to a location cluster. The binary solution may include a set of binary values that indicate whether a particular location cluster of the set of location clusters to which each location of the set of locations is assigned to. For example, a binary value of the binary solution may indicate that the location 406A is uniquely assigned to the location cluster 408A.

The processor 204 may be further configured to generate a set of candidate routes based on the set of location clusters. The generated set of candidate routes may include candidate routes 410A, 410B, 410C, 410D, and 410E. Each candidate route of the set of candidate routes may be generated based on a solution of a travelling salesman problem for each location cluster of the set of location clusters. For example, the processor 204 may use a travelling salesman problem solver to generate the candidate routes 410A for the location cluster 408A. Further, each candidate route (i.e., generated as a solution of a travelling salesman problem) for a location cluster may include a subset of locations of the set of locations. For example, the candidate route 410A may include all locations (a subset of locations) of the set of locations assigned to the location cluster 408A. Each candidate route may originate at the central depot 404, pass through a subset of locations assigned to a location cluster, and terminate at the central depot 404.

Figure 5:
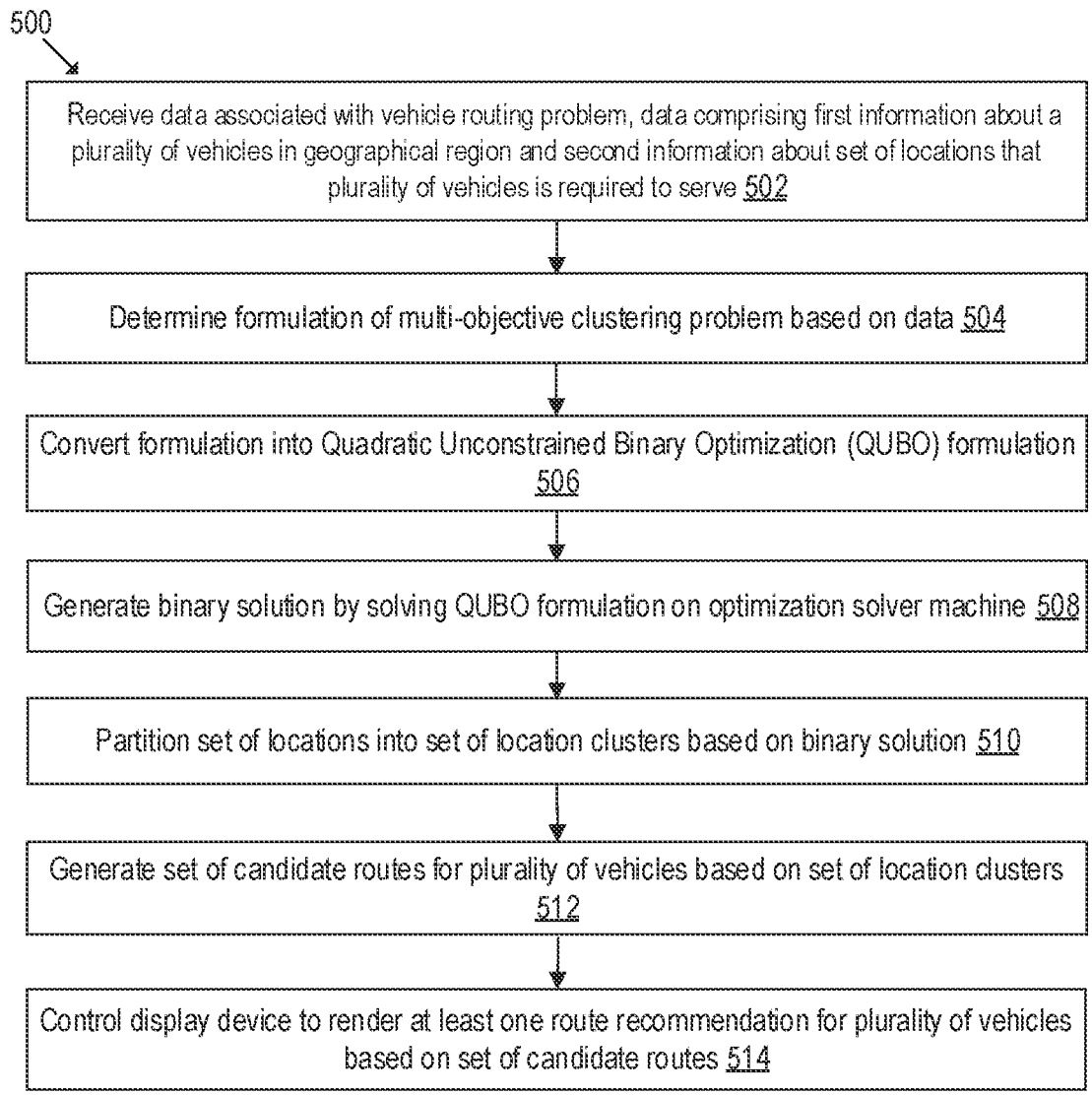
FIG. 5 is a diagram that illustrates a flowchart of an example method for generation of routes for a VRP and variants of VRP.

FIG. 5 is a diagram that illustrates a flowchart of an example method for generation of routes for a VRP and variants of VRP, in accordance with at least one embodiment described in the present disclosure. FIG. 5 is described in conjunction with elements from FIG. 1, FIG. 2, FIG. 3, and FIG. 4. With reference to FIG. 5, there is shown a flowchart 500. The method illustrated in the flowchart 500 may start at 502 and may be performed by any suitable system, apparatus, or device, such as, by the example system 102 of FIG. 1, or the processor 204 of FIG. 2. Although illustrated with discrete blocks, the steps and operations associated with one or more of the blocks of the flowchart 500 may be divided into additional blocks, combined into fewer blocks, or eliminated, depending on the implementation.

At 502, data associated with a vehicle routing problem may be received. In an embodiment, the processor 204 may be configured to receive the data associated with the vehicle routing problem. The data may include first information about the plurality of vehicles (for example, the vehicles 118A and 118B) in a geographical region and second information about a set of locations (for example, the locations 120A ... 120H) that the plurality of vehicles 118A and 118B may be required to serve. The vehicle routing problem may be an optimization problem that may be required to be solved for determination of optimal routes to be used by the plurality of vehicles 118A and 118B for transportation of items to a set of destination locations (i.e., the set of locations 120A to 120H). The usage of the optimal routes, by the plurality of vehicles 118A and 118B, may facilitate transportation of the items between a depot 116 and the set of locations 120A to 120H within a stipulated time at a minimum cost. Details associated with the reception of the data are provided, for example, in FIG. 1 and FIG. 3 (at 302).

At 504, a formulation of a multi-objective clustering problem based on the data may be determined. In an embodiment, the processor 204 may be configured to determine the formulation of the multi-objective clustering problem based on the data. The multi-objective clustering problem may be formulated for ensuring that each location of the set of locations 120A ... 120H is assigned to a location cluster of the set of location clusters (for example, the location clusters 122A and 122B) in the geographical region. The multi-objective clustering problem may be formulated such that a plurality of objective functions included in the multi-objective clustering problem is minimized. In an example, the multi-objective clustering problem may include two objective functions whose objectives may be to minimize distances and angles between each pair of locations assigned to a location cluster of the set of location clusters 122A and 122B.

The multi-objective clustering problem may include a set of constraints. The plurality of objective functions may be minimized such that the set of constrains are satisfied. For example, a constraint of the set of constraints may require that a location of the set of locations 120A ... 120H is uniquely assigned to a location cluster of the set of location clusters 122A and 122B and another constraint of the set of constraints may require that pairwise demand between location clusters of the set of location clusters 122A and 122B is less than a demand threshold. Details associated with determination of the multi-objective clustering problem formulation are provided, for example, in FIG. 1 and FIG. 3 (at 304).

At 506, the multi-objective clustering problem formulation may be converted into a QUBO formulation. In an embodiment, the processor 204 may be configured to convert the multi-objective clustering problem formulation into the QUBO formulation. The multi-objective clustering problem formulation may be converted to a single objective clustering problem that corresponds to the QUBO formulation. The conversion may be based on a summation of the plurality of objective functions of the multi-objective clustering problem, in which each of the plurality of objective functions may be associated with a weight parameter. Thus, the single objective clustering problem may be a weighted summation of the plurality of objective functions of the multi-objective clustering problem. Details associated with the conversion of the multi-objective clustering problem formulation into the QUBO formulation are provided, for example, in FIG. 1 and FIG. 3 (at 306).

At 508, a binary solution, based on a solution of the QUBO formulation by an optimization solver machine, may be generated. In an embodiment, the processor 204 may be configured to generate the binary solution by solving the QUBO formulation on the optimization solver machine (for example, the optimization solver machine 106). The binary solution may be generated by minimizing the weighted summation of the plurality of objective functions by the optimization solver machine 106. The generated binary solution may be a Pareto-optimal solution that indicates whether each location of the set of locations 120A ... 120H belongs to a location cluster of the set of location clusters 122A and 122B.

Based on a variation in the weights, that may be assigned to each of the plurality of objective functions, multiple QUBO formulations may be determined. The processor 204 may generate multiple binary solutions based on corresponding QUBO formulations. The variations in the weights may be such that each of the binary solutions are Pareto-optimal solutions. Details associated with the generation of the binary solution are provided, for example, in FIG. 1 and FIG. 3 (at 308).

At 510, the set of locations 120A ... 120H may be partitioned into the set of location clusters 122A and 122B based on the binary solution. In an embodiment, the processor 204 may be configured to partition the set of locations 120A ... 120H into the set of location clusters 122A and 122B based on the binary solution. The vehicle routing problem may be a computationally complex problem based on a count of locations of the set of locations 120A ... 120H, count of vehicles of the plurality of vehicles 118A and 118B, constraints associated with the set of locations 120A ... 120H, or constraints associated with the plurality of vehicles 118A and 118B. Hence, complex hardware may be required to solve the vehicle routing problem. Moreover, due to the complexity of the vehicle routing problem, a large computational time may be required to obtain a solution of the vehicle routing problem that provides a satisfactory result. To mitigate the requirement of complex hardware and minimize the computational time, the vehicle routing problem may be divided into a set of sub-problems. This may be achieved by partitioning the set of locations 120A ... 120H into the set of location clusters 122A and 122B. Herein, each sub-problem may correspond to determination of a candidate route for each location cluster of the set of location clusters 122A and 122B. Details associated with the partitioning of the set of locations into the set of location clusters are provided, for example, in FIG. 1 and FIG. 3 (at 310).

At 512, a set of candidate routes (for example, a set of candidate routes 124A and 124B), for the plurality of vehicles 118A and 118B, may be generated based on the set of location clusters 122A and 122B. In an embodiment, the processor 204 may be configured to generate the set of candidate routes 124A and 124B for the plurality of vehicles 118A and 118B based on the set of location clusters 122A and 122B. The set of candidate routes 124A and 124B may be generated by solving a route generation problem (for example, a travelling salesman problem) in each location cluster of the set of location clusters 122A and 122B. The set of vehicles 118A and 118B may use the set of candidate routes 124A and 124B to transport items to the set of locations 120A ... 120H at a minimum cost.

The processor 204 may use a single travelling salesman problem solver to solve the set of sub-problems (i.e., determine the set of candidate routes 124A and 124B) serially or use multiple travelling salesman problem solvers to solve all sub-problems of the set of sub-problems in parallel. If a single travelling salesman problem solver is used, the set of sub-problems may be arranged in a queue and each sub-problem may be provided to the travelling salesman problem solver in a serial order. On the other hand, all sub-problems of the set of sub-problems may be fed as input to the multiple travelling salesman problem solvers at the same instance to solve the set of sub-problems in parallel. Details associated with the generation of the set of candidate routes are provided, for example, in FIG. 1 and FIG. 3 (at 312).

At 514, the user device 104 may be controlled to render at least one route recommendation for the plurality of vehicles 118A and 118B based on the set of candidate routes 124A and 124B. In an embodiment, the processor 204 may be configured to control the user device 104 to render at least one route recommendation for the plurality of vehicles 118A and 118B based on the set of candidate routes 124A and 124B. The set of candidate routes 124A and 124B may be rendered on a display of the user device 104 (or the display device 210A) as recommendations, based on a determination of the set of candidate routes 124A and 124B as optimal routes. The user 112 may view the optimal routes that may be used for transportation of items to the set of locations 120A . . . 120H. Details associated with the control of the user device 104 to render route recommendations are provided, for example, in FIG. 1 and FIG. 3 (at 320).

Although the flowchart 500 is illustrated as discrete operations, such as 502, 504, 506, 508, 510, 512, and 514. However, in certain embodiments, such discrete operations may be further divided into additional operations, combined into fewer operations, or eliminated, depending on the implementation without detracting from the essence of the disclosed embodiments.

Various embodiments of the disclosure may provide one or more non-transitory computer-readable storage media configured to store instructions that, in response to being executed, cause a system (such as, the system 102) to perform operations. The operations may include receiving data associated with a vehicle routing problem. The data may include first information associated with a plurality of vehicles in a geographical region and second information associated with a set of locations that the plurality of vehicles may be required to serve. The operations may further include determining a formulation of a multi-objective clustering problem based on the data. The operations may further include converting the formulation into a QUBO formulation. The operations may further include generating a binary solution by solving the QUBO formulation on an optimization solver machine. The operations may further include partitioning the set of locations into a set of location clusters based on the binary solution. The operations may further include generating a set of candidate routes for the plurality of vehicles based on the set of location clusters. The operations may further include controlling a user device to render at least one route recommendation for the plurality of vehicles based on the set of candidate routes.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:
receiving data associated with a vehicle routing problem, the data comprising first information about a plurality of vehicles in a geographical region and second information about a set of locations that the plurality of vehicles is required to serve;

determining a formulation of a multi-objective clustering problem based on the data;

converting the formulation into a Quadratic Unconstrained Binary Optimization (QUBO) formulation;

generating a binary solution by solving the QUBO formulation on an optimization solver machine;

partitioning the set of locations into a set of location clusters based on the binary solution;

generating a set of candidate routes for the plurality of vehicles based on the set of location clusters; and controlling a user device to render at least one route recommendation for the plurality of vehicles based on the set of candidate routes.

2. The method according to claim 1, wherein the data further comprises a first constraint associated with the plurality of vehicles and a second constraint associated with the set of locations.

3. The method according to claim 2, wherein the first constraint is a capacity constraint, and the second constraint is a demand constraint.

4. The method according to claim 1, wherein the multi-objective clustering problem comprises a plurality of objective functions and a set of constraints that is applicable on the plurality of objective functions, and the plurality of objective functions is to be minimized to obtain an optimal partitioning of the set of locations into the set of location clusters.

5. The method according to claim 4, wherein the plurality of objective functions comprises:

a distance-based objective function to minimize an intra-cluster pairwise distance between each pair of locations of the set of locations, and an angle-based objective function to minimize an intra-cluster pairwise angle between each pair of locations of the set of locations.

6. The method according to claim 4, wherein the set of constraints comprises:

a third constraint that requires that each location of the set of locations is uniquely assigned to a location cluster of the set of location clusters, and a fourth constraint that requires that a difference in total demands between a pair of location clusters of the set of location clusters is below a demand threshold.

7. The method according to claim 1, further comprising initializing values of weight parameters associated with the QUBO formulation, wherein the QUBO formulation is solved based on the values.

8. The method according to claim 7, wherein the weight parameters correspond to weight coefficients associated with respective quadratic objective functions in the QUBO formulation.

9. The method according to claim 1, further comprising:

determining an objective function of a route generation problem for each location cluster of the set of location clusters; and solving the route generation problem based on a minimization of the objective function for each location cluster of the set of location clusters to generate a candidate route of the set of candidate routes for a corresponding location cluster of the set of location clusters.

10. The method according to claim 9, wherein the route generation problem is a set partitioning problem.

11. The method according to claim 1, wherein the binary solution of the QUBO is Pareto-optimal solution.

12. The method according to claim 1, wherein the binary solution includes a set of binary values, each of which indicates whether a location of the set of locations belongs to a location cluster of the set of location clusters.

13. One or more non-transitory computer-readable storage media configured to store instructions that, in response to being executed, cause a system to perform operations, the operations comprising:

receiving data associated with a vehicle routing problem, the data comprising first information about a plurality of vehicles in a geographical region and second information about a set of locations that the plurality of vehicles is required to serve;

determining a formulation of a multi-objective clustering problem based on the data;

converting the formulation into a Quadratic Unconstrained Binary Optimization (QUBO) formulation;

generating a binary solution by solving the QUBO formulation on an optimization solver machine;

partitioning the set of locations into a set of location clusters based on the binary solution;

generating a set of candidate routes for the plurality of vehicles based on the set of location clusters; and controlling a user device to render at least one route recommendation for the plurality of vehicles based on the set of candidate routes.

14. The one or more non-transitory computer-readable storage media according to claim 13, wherein the data further comprises a first constraint associated with the plurality of vehicles and a second constraint associated with the set of locations.

15. The one or more non-transitory computer-readable storage media according to claim 14, wherein the first constraint is a capacity constraint, and the second constraint is a demand constraint.

16. The one or more non-transitory computer-readable storage media according to claim 13, wherein the multi-objective clustering problem comprises a plurality of objective functions and a set of constraints that is applicable on the plurality of objective functions, and the plurality of objective functions is to be minimized to obtain an optimal partitioning of the set of locations into the set of location clusters.

17. The one or more non-transitory computer-readable storage media according to claim 16, wherein the plurality of objective functions comprises:

a distance-based objective function to minimize an intra-cluster pairwise distance between each pair of locations of the set of locations, and an angle-based objective function to minimize an intra-cluster pairwise angle between each pair of locations of the set of locations.

18. The one or more non-transitory computer-readable storage media according to claim 16, wherein the set of constraints comprises:

a third constraint that requires that each location of the set of locations is uniquely assigned to a location cluster of the set of location clusters, and a fourth constraint that requires that a difference in total demands between a pair of location clusters of the set of location clusters is below a demand threshold.

19. The one or more non-transitory computer-readable storage media according to claim 13, wherein the binary solution includes a set of binary values, each of which indicates whether a location of the set of locations belongs to a location cluster of the set of location clusters.

20. A system, comprising:
a memory storing instructions; and
a processor, coupled to the memory, that executes the instructions to perform a process comprising:
- receiving data associated with a vehicle routing problem, the data comprising first information about a plurality of vehicles in a geographical region and second information about a set of locations that the plurality of vehicles is required to serve;
- determining a formulation of a multi-objective clustering problem based on the data;
- converting the formulation into a Quadratic Unconstrained Binary Optimization (QUBO) formulation;
- generating a binary solution by solving the QUBO formulation on an optimization solver machine;
- partitioning the set of locations into a set of location clusters based on the binary solution;
- generating a set of candidate routes for the plurality of vehicles based on the set of location clusters; and
- controlling a user device to render at least one route recommendation for the plurality of vehicles based on the set of candidate routes.

\* \* \* \* \*